(12) United States Patent
Santana

(10) Patent No.: US 11,637,449 B2
(45) Date of Patent: Apr. 25, 2023

(54) WIRELESS CHARGING AIR COMPRESSOR

(71) Applicant: Daniel Santana, Tampa, FL (US)

(72) Inventor: Daniel Santana, Tampa, FL (US)

(*) Notice: Subject to any disclaimer, the term of this patent is extended or adjusted under 35 U.S.C. 154(b) by 0 days.

(21) Appl. No.: 17/748,503

(22) Filed: May 19, 2022

(65) Prior Publication Data

US 2022/0274126 A1 Sep. 1, 2022

Related U.S. Application Data

(63) Continuation of application No. 16/416,106, filed on May 17, 2019, now abandoned.

(51) Int. Cl.
*H02J 50/00* (2016.01)
*B05B 17/04* (2006.01)
*A45D 40/26* (2006.01)

(52) U.S. Cl.
CPC ............ *H02J 50/005* (2020.01); *A45D 40/26* (2013.01); *B05B 17/04* (2013.01); *A45D 2200/057* (2013.01)

(58) Field of Classification Search
CPC .. B05B 17/04; A45D 40/26; A45D 2200/057; H02J 7/025; H02J 7/027; H02J 50/005

USPC .................................................. 239/329–332
See application file for complete search history.

(56) References Cited

U.S. PATENT DOCUMENTS

| 5,131,598 | A | 7/1992 | Hoogeveen, Jr. |
| 7,798,061 | B2 | 9/2010 | Dilou |
| 9,358,561 | B2 | 6/2016 | Johnson et al. |
| 9,545,643 | B2 | 1/2017 | Thompson et al. |

*Primary Examiner* — Christopher S Kim
(74) *Attorney, Agent, or Firm* — Boudwin Intellectual Property; Daniel Boudwin

(57) ABSTRACT

A wireless charging air compressor includes a housing having a motor operably connected to an air pump, which forces air into a cavity, and an actuator operably connected to the cavity for selectively discharging air through a nozzle secured to the housing. A rechargeable battery is operably connected to the motor for providing power to the motor. A wireless charging receiver mechanism is operably connected to the rechargeable battery. The wireless charging receiver mechanism is configured to recharge the rechargeable battery upon interacting with a wireless charging transmission mechanism. This allow the rechargeable battery to be recharged without the need for a hardwired connection.

9 Claims, 3 Drawing Sheets

WIRELESS CHARGING AIR COMPRESSOR

CROSS REFERENCE TO RELATED APPLICATIONS

This application is a continuation of, and claims the benefit of, U.S. Nonprovisional patent application Ser. No. 16/416,106, filed on May 17, 2019. The above identified patent application is herein incorporated by reference in its entirety to provide continuity of disclosure.

BACKGROUND OF THE INVENTION

Airbrush equipment is regularly employed in beauty and grooming services in order to provide clients the ability to obtain custom designs such as coatings on nails, hair highlights, and skin coatings. The process involves aerosolizing a paint and applying thin coats to a surface. Aerosolizing involves using compressed air in combination with an attached nozzle to direct thin coats of paints on specific areas in specific designs.

As specificity and detail are key reasons for using airbrush techniques, it is important for the airbrush tools to be easy to use. Portability of said airbrush tools is also desirable, and to that end improvements have been developed that aid with ease of moving, positioning, and directing nozzles and the resultant thin coats of paint. In pursuit of portability of the tools, wireless air compressors and nozzles have been created. These wireless tools within the industry generally rely on direct current sources, such as single use alkaline batteries, or rechargeable batteries, to drive the air compressor motor. One drawback to using single-use batteries is the need to continuously change direct current power sources, or regularly plug the air compressor into an AC power source, such as a wall outlet, in order to have sufficiently charged batteries in the case of rechargeable batteries. When AC power is needed, there is generally required a need for hard wired outlet connections that plug into the wireless air compressor at some point to either provide continuous power or a battery recharge. The wires can make the use of the air compressor more difficult, particularly when precision control is needed for complex colorings or patterns being applied. The use of the wires also increase clutter in the surrounding environment. In view of the above concerns, it is desirable to provide a wireless air compressor that includes an internal battery power supply which can be recharged via wireless power transmission from a power source to an onboard wireless charging mechanism that charges the battery.

In light of the devices disclosed in the known art, it is submitted that the present invention substantially diverges in design elements from the known art and consequently it is clear that there is a need in the art for an improvement to existing wireless air compressor devices, particularly due to the lack of wireless charging air compressors that can recharge without the need for additional wired connections. In this regard the present invention substantially fulfills these needs.

SUMMARY OF THE INVENTION

In view of the foregoing disadvantages inherent in the known types of wireless or battery-powered air compressors now present in the prior art, the present invention provides a wireless air compressor with wireless charging capabilities, wherein the same can be utilized to provide convenience when using the wireless air compressor, and when charging its internal battery power supply.

In general, the wireless charging air compressor includes a housing having a motor operably connected to an air pump, which forces air into a cavity, and an actuator operably connected to the air cavity for selectively discharging air through a nozzle secured to the housing. A rechargeable battery is operably connected to the motor for providing power to the motor. A wireless charging receiver mechanism is operably connected to the rechargeable battery. The wireless charging receiver mechanism is configured to recharge the rechargeable battery upon interacting with a wireless charging transmission mechanism. This allow the rechargeable battery to be recharged without the need for a hardwired connection.

A primary object of the present invention is to provide a battery powered, wireless air compressor for use with air brush tools, whereby the air compressor is wirelessly rechargeable via wireless power transmission. In one example, the present invention can utilize inductive coupling to achieve wireless power transmission. As another example, the present invention can utilize a wireless charging adapter to achieve wireless power transmission.

Other objects, features, and advantages of the present invention will become apparent given the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached figures. For the purposes of presenting a brief and clear description of the present invention, the preferred embodiment will be discussed as used for providing a wireless or battery powered air compressor that has wireless charging capabilities. The figures are intended for representative purposes only and should not be considered to be limiting in any respect.

Figure 1:
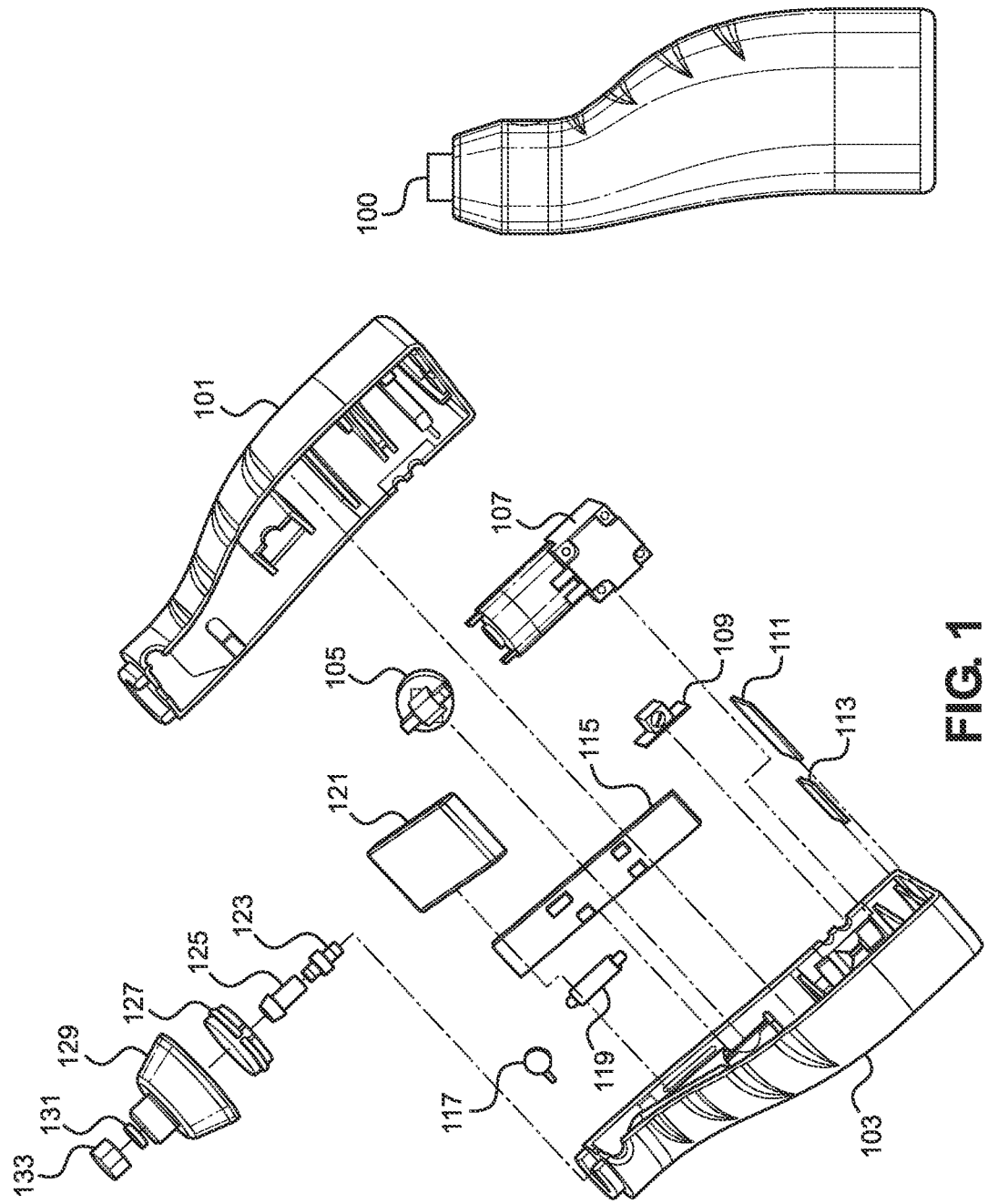
FIG. 1 shows an expanded perspective view and a side view of one embodiment of the wireless charging air compressor.

Referring now to FIG. 1, there is shown an expanded perspective view and a side view of one embodiment of the wireless charging air compressor. The wireless charging air compressor 100 includes a housing, shown as a pair of housing halves 101 and 103 in the illustrated embodiment which are then joined together to form the housing and interior volume.

The internal volume of the housing further includes a circuit board 115 which houses the electronics which control the various electronic components of the air compressor. An electric motor 107 is operably connected to an air pump 108, such that when activated, the motor 107 forces air into a cavity 140 which is operably connected to the air pump 108. The cavity 140 can be an air tank, a tube, an open interior space between the housing halves 101 and 103, or any other cavity that is capable of containing air. The cavity is operably connected to a discharge nozzle (shown in FIG. 2). An actuator 117 is operably connected to the discharge nozzle, such that when the actuator is activated, the discharge nozzle dispenses compressed air from the cavity. The wireless charging air compressor 100 can further include one or more valves, a passthrough connection 123, air tanks, and other connectors to operationally connect the air supply to the nozzle. The upper end of the housing 100 includes one or more nozzle connectors 127 and 129, with an airtight seal 131, and a connection element 133. The nozzle can be removably secured to the nozzle connector 129 via threading or any other suitable connection mechanism. In some embodiments, the air compressor further includes a material reservoir operably connected to a needle outlet and material actuator. The material actuator can release a flow of material via the needle valve, such that the material is released proximal to the flow of air. The air flow draws material from the needle valve outlet to atomize the material as it is expelled from the airbrush 100 via the compressed air flow. The user can depress the material actuator while moving the air compressor in the desired manner depending on the current application.

The motor 107 is powered via connection with a power source, which in the present embodiment is a rechargeable battery 121, that serves as a power supply for the motor. Possible rechargeable batteries 121 may include lithium ion, nickel-metal, nickel-cadmium, lead-acid, magnesium, lithium polymer, or any other suitable rechargeable battery type. In one embodiment, a single rechargeable battery 121 is utilized. If greater output or current draw is needed, the present invention can include multiple rechargeable batteries 121.

The rechargeable battery 121 is operably connected to a wireless charging receiver mechanism 111, which can be attached to a support 113 within the housing. The wireless charging receiver mechanism 111 may be an inductive coupling-type wireless charging mechanism, which interacts with a corresponding inductive coupling-type wireless transmission mechanism, in order to provide power to the rechargeable battery 121. However, any other suitable type of wireless charging mechanism that allows for wireless power transmission may be utilized. For example, the shown embodiment includes a wall outlet connector 125, which allows the rechargeable battery 121 to be charged via a connection to a wall outlet or similar alternating current power supply. The wireless charging air compressor 100 also may include a visual indicator 109, which is an LED affixed to the circuit board or control circuit 115 in the shown embodiment. The visual indicator 109 is operably connected to the rechargeable battery 121 such that it is configured to illuminate and indicate to the user when the rechargeable battery 121 is receive power for recharging. In one embodiment, the visual indicator 109 may then turn off after the rechargeable battery 121 is fully recharged. In the shown embodiment, a pressure sensor 105 is operably connected to the control circuit and to the air cavity. The pressure sensor 105 is configured to deactivate the motor 107 when the pressure sensor 105 detects a preprogrammed pressure level within the cavity.

Figure 2:
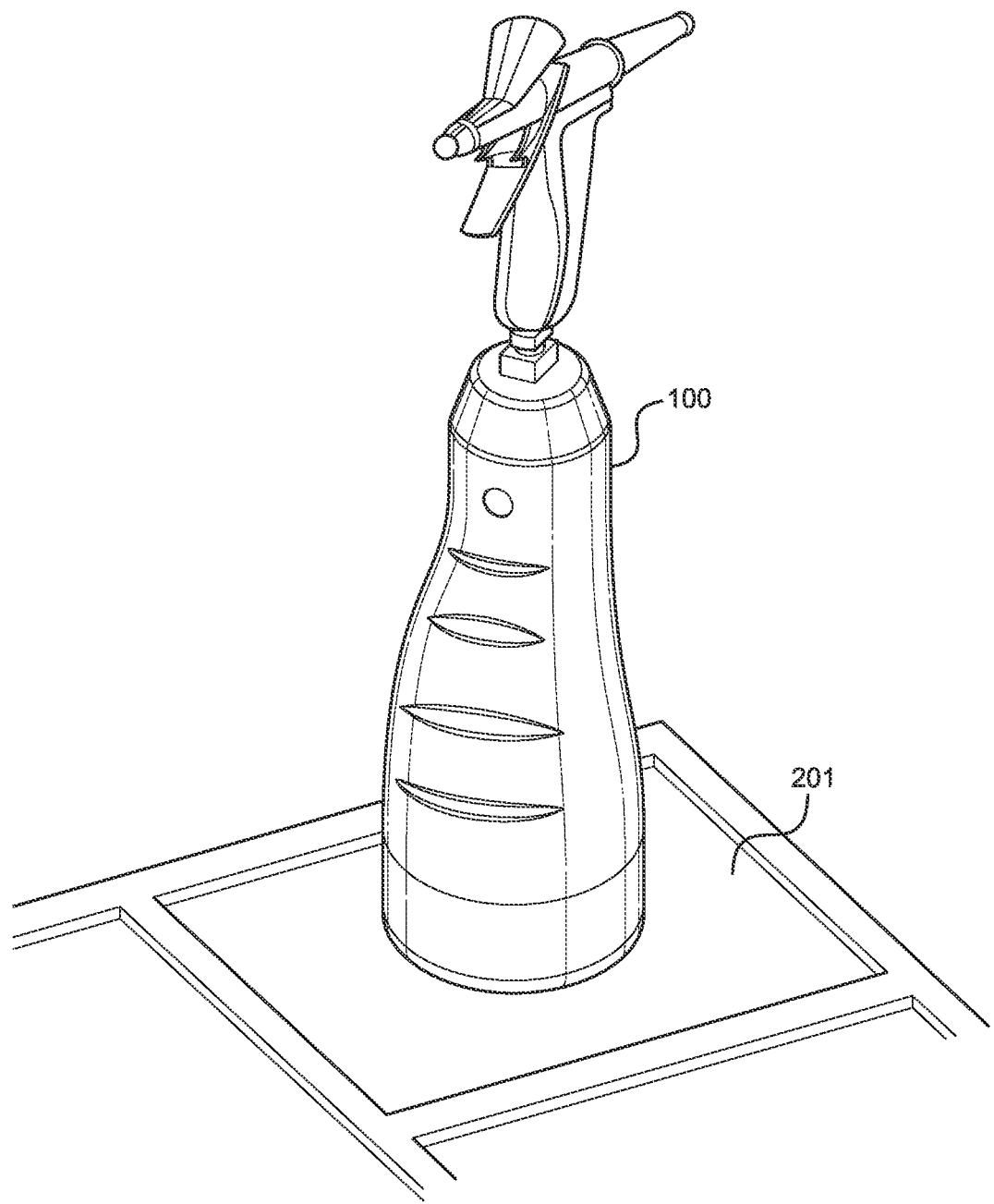
FIG. 2 shows a perspective view of an embodiment of the wireless charging air compressor positioned on a wireless charging mat.

Referring now to FIG. 2, there is shown a perspective view of an embodiment of the wireless charging air compressor positioned on a wireless charging mat. In one embodiment, the internal wireless charging mechanism is an inductive type mechanism. When the wireless charging air compressor 100 is placed on a wireless charging transmission mechanism 201 having a corresponding inductive power transmission mechanism, the internal rechargeable battery is recharged.

The nozzle 205 can include any suitable nozzle for air compressors, including but not limited to atomizer nozzles, electrostatic process nozzles, ultrasonic nozzles, and spray nozzles. In the shown embodiment, the nozzle 205 is removably secured to the wireless charging air compressor 100, which allows for attachment of different types of nozzles, and also allows the nozzles to be easily removed for cleaning.

Figure 3:
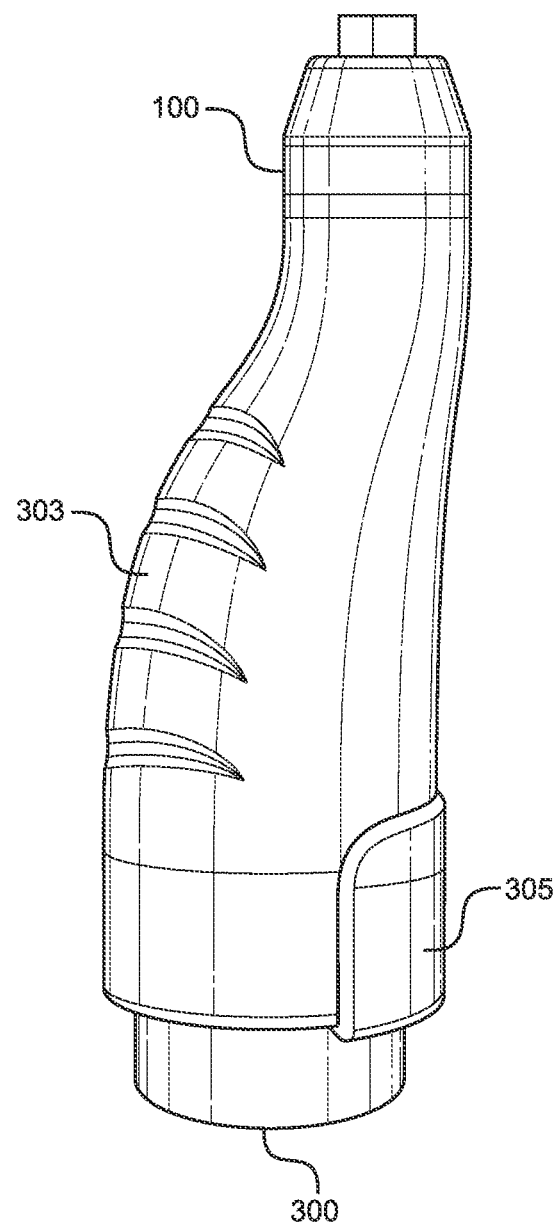
FIG. 3 shows a perspective view of an embodiment of the wireless charging air compressor with an attached wireless charging adapter.

Referring now to FIG. 3, there is shown a perspective view of an embodiment of the wireless charging air compressor 100 with an attached wireless charging adapter 300. In one embodiment, the wireless charging air compressor 100 includes a removably secured wireless charging adapter 300 which houses the wireless charging receiver mechanism. In such an embodiment, the wireless charging air compressor 100 includes electrical contacts that can physically connect to corresponding electrical contacts of a wired charging device. The housing can also include an exterior textured gripping element 303 that facilitates easy handling for the user. When wireless charging is desired, a coupling within the upper end of the adapter 300 is configured to electrically connect the wireless charging receiver mechanism to the internal rechargeable battery. The wireless charging adapter 300 can then be placed on or otherwise removably secured to a wireless power transmission mechanism. In this way, the present invention can provide additional options for recharging, both wired and wireless if needed.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wireless charging air compressor, comprising:
a housing;
a motor operably connected to an air pump;
a cavity operably connected to the air pump which receives air from the air pump;
an actuator operably connected to the cavity for selectively discharging air through a nozzle secured to the housing;
a rechargeable battery operably connected to the motor and a control circuit;
a wireless charging receiver mechanism operably connected to the rechargeable battery;

wherein the wireless charging receiver mechanism is configured to recharge the rechargeable battery upon interacting with a wireless charging transmission mechanism.

2. The wireless charging air compressor of claim 1, further comprising a pressure sensor operably connected to the control circuit and to the air cavity, wherein the control circuit is configured to deactivate the motor automatically when the pressure sensor detects a preprogrammed pressure within the air cavity.

3. The wireless charging air compressor of claim 1, wherein the nozzle is removably secured to the housing.

4. The wireless charging air compressor of claim 1, wherein the wireless charging receiver mechanism is disposed within a wireless charging adapter that is removably secured to the housing.

5. The wireless charging air compressor of claim 1, wherein the wireless charging receiver is an inductive coupling wireless power receiver.

6. The wireless charging air compressor of claim 1, further comprising a textured gripping element disposed on the housing.

7. The wireless charging air compressor of claim 1, wherein the control circuit is a circuit board disposed within the housing.

8. The wireless charging air compressor of claim 1, wherein the wireless charging receiver mechanism is affixed to a support within the housing.

9. The wireless charging air compressor of claim 1, further comprising a wall outlet receiver operably connected to the rechargeable battery, for optionally charging the battery via an alternating current power source.

\* \* \* \* \*